United States Patent [19]

Carr

[11] 4,094,231

[45] June 13, 1978

[54] ROTARY ACTUATOR AND METHODS OF FABRICATION

[75] Inventor: Paul Carr, Massillon, Ohio

[73] Assignee: Flo-Tork, Inc., Orrville, Ohio

[21] Appl. No.: 582,401

[22] Filed: Jun. 2, 1975

Related U.S. Application Data

[63] Continuation-in-part of Ser. No. 447,763, Jun. 10, 1974, abandoned.

[51] Int. Cl.² ............................................. F01B 9/00
[52] U.S. Cl. .................................. 92/128; 92/13.41;
     92/138; 92/151; 251/58; 251/60
[58] Field of Search .................. 92/13.4, 13.41, 13.5,
     92/13.6, 150, 151, 138, 128; 251/58, 60

[56] References Cited

U.S. PATENT DOCUMENTS

| 2,321,267 | 6/1943 | Van Der Werff | 92/138 |
|---|---|---|---|
| 2,450,653 | 10/1948 | Galley et al. | 92/138 |
| 2,848,186 | 8/1959 | Bayer | 251/58 |
| 2,928,375 | 3/1960 | Herrmann | 92/138 |
| 3,146,681 | 9/1964 | Sheesley | 92/13.6 |
| 3,148,595 | 9/1964 | Looney | 92/11 |
| 3,166,495 | 1/1965 | Parks | 251/58 |
| 3,199,416 | 8/1965 | Robson | 92/13.6 |
| 3,218,024 | 11/1965 | Kroekel | 251/58 |
| 3,237,528 | 3/1966 | Rose | 92/125 |
| 3,260,496 | 7/1966 | Borcherdt | 251/58 |
| 3,261,266 | 7/1966 | Ledeen | 92/138 |
| 3,394,632 | 7/1968 | Priese | 92/68 |
| 3,452,961 | 7/1969 | Forsman | 251/58 |
| 3,650,506 | 3/1972 | Bruton | 251/58 |
| 3,709,106 | 1/1973 | Shafer | 251/58 |
| 3,801,062 | 4/1974 | Arn | 251/58 |
| 3,977,305 | 8/1976 | Sondergaard | 251/58 |

Primary Examiner—Martin P. Schwadron
Assistant Examiner—Abraham Hershkovitz
Attorney, Agent, or Firm—Oldham, Oldham, Hudak & Weber Co.

[57] ABSTRACT

A fluid-operated actuator for rotatable valve stems and the like includes a double ended piston reciprocally carried in a sealed housing. The housing has a pair of sleeves threaded into a central body. The sleeves support opposite end regions of the piston and provide adjustable stops to limit the piston stroke. A stem is journaled for rotation in the body. The stem and piston are interconnected by a lever slidably received in the stem and pivotally coupled to the piston. The lever rotates the stem in response to reciprocation of the piston. The sliding connection between the lever and the stem provides a thrust connection between the lever and the stem and permits the lever-arm through which torque forces are applied to the stem to increase as the piston nears opposite ends of its stroke. An adapter bushing is removably connected to one end region of the stem. The bushing is interchangeable with other bushings having standard-sized central apertures and is removable for through-machining of its central aperture to facilitate connection of the actuator to any shape of valve stem. Assembling the actuator is facilitated by providing the piston with a slot which will nest the lever, whereby the piston and lever are insertable as an assembly into the housing.

5 Claims, 9 Drawing Figures

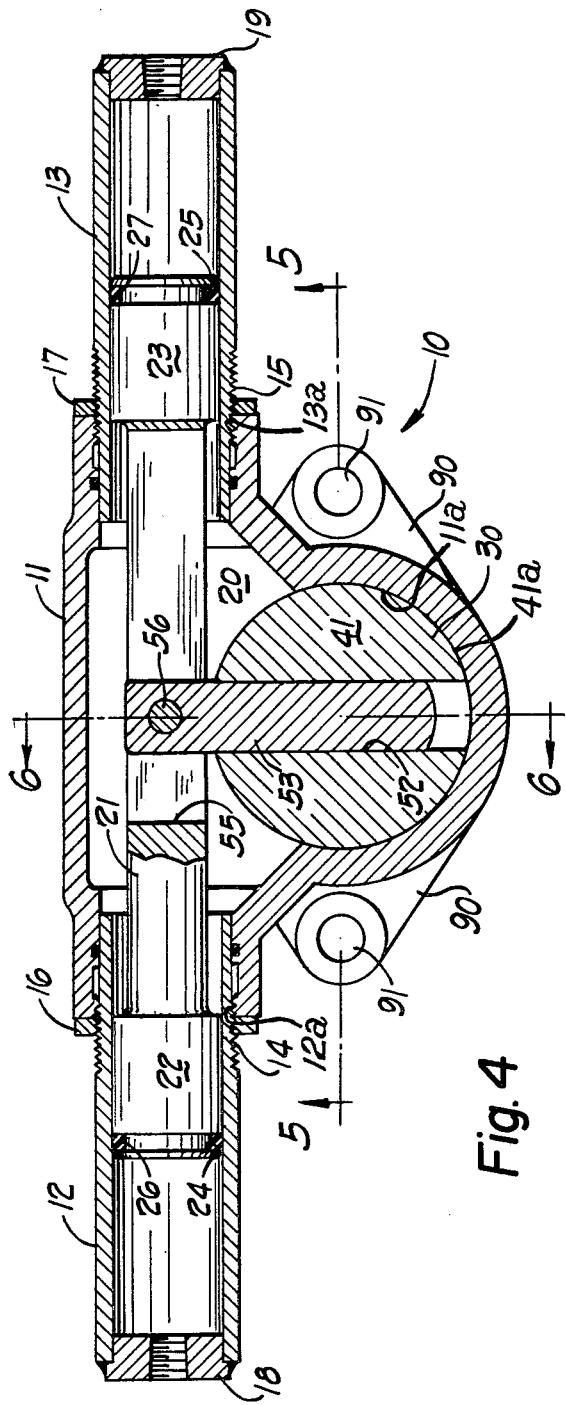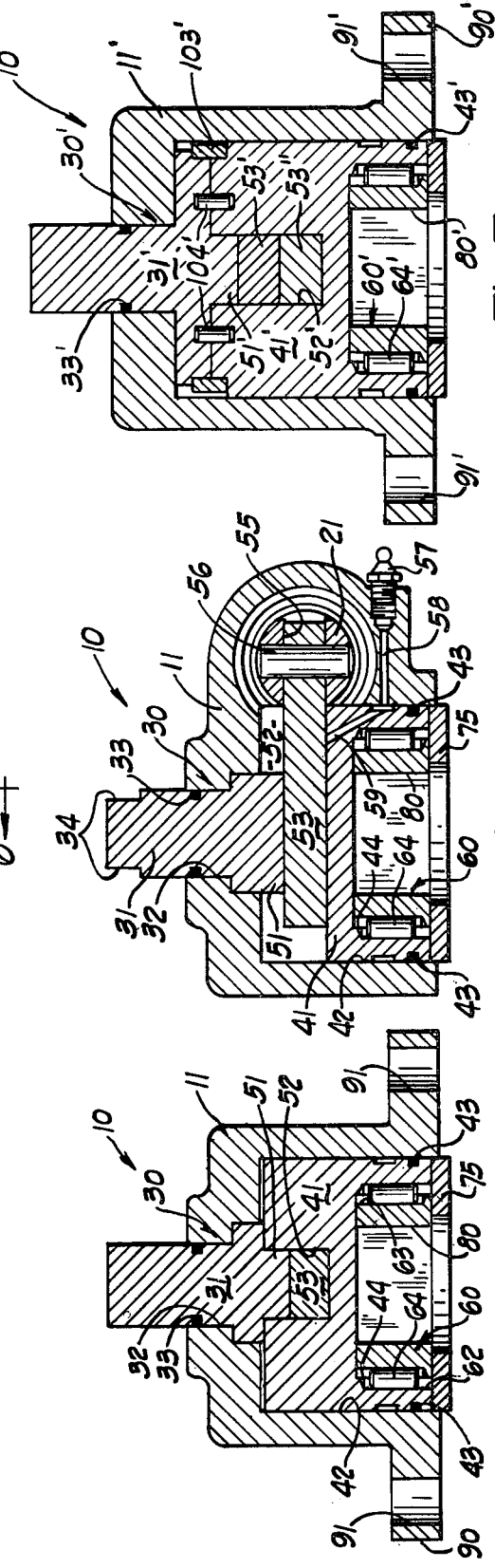

ROTARY ACTUATOR AND METHODS OF FABRICATION

CROSS-REFERENCE TO RELATED APPLICATION

The present application is a continuation-in-part of application Ser. No. 477,763, filed June 10, 1974, now abandoned.

BACKGROUND OF THE INVENTION

1. Field of the Invention

The present invention relates to rotary actuators of the type which utilize pressurized fluid to produce rotary motion, and more particularly relates to a novel and improved actuator which is well adapted for use with a variety of valves requiring a stem rotation of about 90°.

2. Prior Art

A number of fluid operated rotary actuators have been proposed which typically include a reciprocable piston coupled to a rotatable stem for rotating the stem as the piston is reciprocated. Most of these proposals provide a relatively compex and expensive actuator assembly, particularly where the actuator has a relatively high torque output rating.

There has been a need for a relatively simple and inexpensive actuator for use with valves which require a stem rotation of about 90°. One problem presented by such applications is a wide variance in valve stem configurations. Present day valve stems have end configurations which typically include opposed flats, squares of various sizes, splines, and other shapes. Providing a reliable and readily adaptable actuator-to-valve stem connection is a significant concern.

Another problem encountered in providing a versatile valve actuator is the need for a compactly constructed actuator capable of relatively high-torque outputs near the ends of its rotational stroke. Many valve installations are made in closely confined areas which necessitate a compact actuator structure. Many valves additionally require the application of relatively high torque forces in seating and unseating the valves, but need only low torque forces at other times. Most known actuators have not satisfied the need for a compactly constructed device capable of producing a high torque for seating and unseating valves.

Still another problem is that many valves are installed in submerged locations. A number of present day actuators are not well adapted for submerged installation.

Still another problem with many proposed doubleacting rotary actuators is that their assembly is complicated by a need to interconnect a lever with an actuator piston after the piston has been inserted in the housing. Prior art proposals have not permitted the assembly of a piston and lever while the piston is removed from the housing because once the piston and lever are assembled, the piston cannot then be inserted into the housing.

Some prior art proposals describe an actuator having a housing which reciprocally mounts a piston, which journals an output shaft, and which houses a lever that interconnects the piston and the output shaft. Most of these proposals rigidly connect the lever to the rotating stem and slidably connect the lever to the piston. Such proposals provide a sliding thrust connection with the lever which has only a very small, essentially live contact area of surface engagement. This small area of engagement produces a concentration of forces which inhibits efficient operation of the actuator and promotes wear of the parts which form the sliding connection. Forces transmitted longitudinally of the lever cause unnecessary loading of the bearings which journal the stem and inhibit smooth operation of the actuator. Such proposed actuators are not well adapted to carry relatively high loads.

One prior art proposal describes a hydraulic control valve which employs a piston-operated actuator. The actuator has a double ended piston which is normally centered along its stroke by a pair of springs which engage opposite ends of the piston. A slot is formed in a central region of the piston, and one end region of a lever extends into this slot for pinned pivotal connection to the piston. The other end region of the lever is slidably received in a slot formed in a rotatable stem journaled by the actuator housing. The stem is not journaled over a large area of engagement in a region which surrounds its sliding connection with the lever. This relatively light duty actuator is not designed to carry heavy loads but rather is intended simply to position the stem of a hydraulic control. In order to assemble the actuator, the housing is left open along one side to permit access to the pinned pivotal connection between the lever and the piston. The actuator is not well adapted for installation in a submerged application.

SUMMARY OF THE INVENTION

The present invention overcomes the foregoing and other drawbacks of the prior art, and provides a novel and improved, high versatile rotary actuator.

One feature of the actuator is its simple, compact design which includes a sealed, submersible housing. The housing is a three-part construction including a central body and a pair of sleeves threaded into opposite sides of the body. Opposite ends of a reciprocable piston are carried in the sleeves. The sleeve ends form stops and can be threaded into and out of the body to adjust the piston stroke.

A rotatable two-piece stem is journaled in the body. A sliding lever-type connection is provided between the piston and the stem internally of the body. A lever has one end region which extends into a slot formed in a central portion of the piston and pivotally connects with the piston. The other end of the lever is received in a slot in the stem. As the piston reciprocates, the lever slides in the slot and rotates the stem. The lever-arm through which the piston acts on the stem diminishes as the piston approaches the center of its stroke and increases as the piston nears the ends of its stroke. This variable lever-arm porvides the necessary increased torque output near the ends of the piston stroke for seating and unseating valves.

Opposite end regions of the stem are accessible from outside the body. One end region is provided with flats for manual rotation with a wrench. The other end region defines a cylindrical recess.

An adapter bushing is removably carried in the cylindrical recess. Dowel pins are received in grooves formed in the bushing and the stem to provide a driving connection between the bushing and the stem. The adapter bushing has a central through-bushing configured to receive and mate with the end region of a valve stem.

The adapter bushing serves in several ways to provide a versatile connection with valve stems of different configurations. First, the bushing is interchangeable with a number of other bushings each having a different central aperture for receiving the more standard valve stem configurations. Second, the bushing is removable from the actuator to facilitate through-machining of its central aperture to provide a mating fit with a nonstandard valve stem.

The removable nature of the bushing help to minimize the maintenance inventory of replacement units kept in plants where large numbers of the actuators are in use. Replacement of an actuator is effected by using the bushing already in service with a new actuator unit. The ease with which such replacements can be made minimizes down time if an actuator should fail while in service.

The dowel pin connection between the adapter bushing and the stem is formed in an extremely simple and inexpensive manner. The adapter bushing is initially inserted backwards in the cylindrical stem recess. Four holes are then drilled part way through the bushing at spaced positions along the circular juncture between the bushing and the stem. One side of each hole forms a semicircular groove in the stem while the other side forms a semicircular groove in the periphery of the bushing. The bushing is then removed, four dowel pins are inserted in its grooves, and the bushing is reinserted with its front side forward. The dowel pins are held in place by closed-end portions of the grooves.

A feature of the described actuator is the ease with which it can be assembled. The piston slot which receives the lever is of sufficient size to permit the lever to nest within the piston. This arrangement permits the lever and the piston to be pivotally interconnected while the piston is outside the housing. The interconnected piston and lever can then be inserted as an assembly into the housing.

An additional feature of the present invention is the provision of a two-piece stem. One stem portion is inserted into the housing prior to the insertion of the piston and lever assembly. This first stem portion has a projection which extends alongside the lever. The other stem portion defines a three-sided slot which slidably receives the lever. The projection on the first stem portion extends into the lever receiving slot to drivingly interconnect the two stem portions and to form the fourth side of the slot. Both stem portions accordingly slidably engage the lever and provide a large area thrust connection.

The stem has a relatively large diameter central portion which provides several advantages. The periphery of this portion is engaged along much of its length by a curved wall of the housing to provide a large area thrust connection that journals the stem in the housing. The large stem portion diameter provides a relatively long slot which establishes a large area thrust connection between the stem and the lever. The length of the slot is sufficiently long to accommodate the travel of the lever as the lever slides in the slot, whereby the lever need never project beyond the slot end adjacent the curved housing wall. No housing bulge or oversized housing construction is therefore required to accommodate the sliding end region of the lever.

It is a general object of the present invention to provide a novel and improved fluid-operated rotary actuator.

An additional object is to provide novel and improved methods of fabricating a rotary actuator.

Still another object is to provide a novel and improved connection between a rotary actuator and a rotatable number.

Other objects and a fuller understanding of the invention may be had by referring to the following description and claims taken in conjunction with the accompanying drawings.

BRIEF DESCRIPTION OF THE DRAWINGS

FIG. 4 is a cross-sectional view as seen from the plane indicated by the line 4—4 in FIG. 1;

FIGS. 5 and 6 are cross-sectional views as seen, respectively, from the planes indicated by the lines 5—5 and 6—6 in FIG. 4;

FIG. 7 is a cross-sectional view similar to FIG. 5 of a heavier-duty actuator embodiment; and, FIGS. 8 and 9 are exploded perspective views of several parts of the actuator of FIG. 1.

DESCRIPTION OF THE PREFERRED EMBODIMENT

Figure 1:
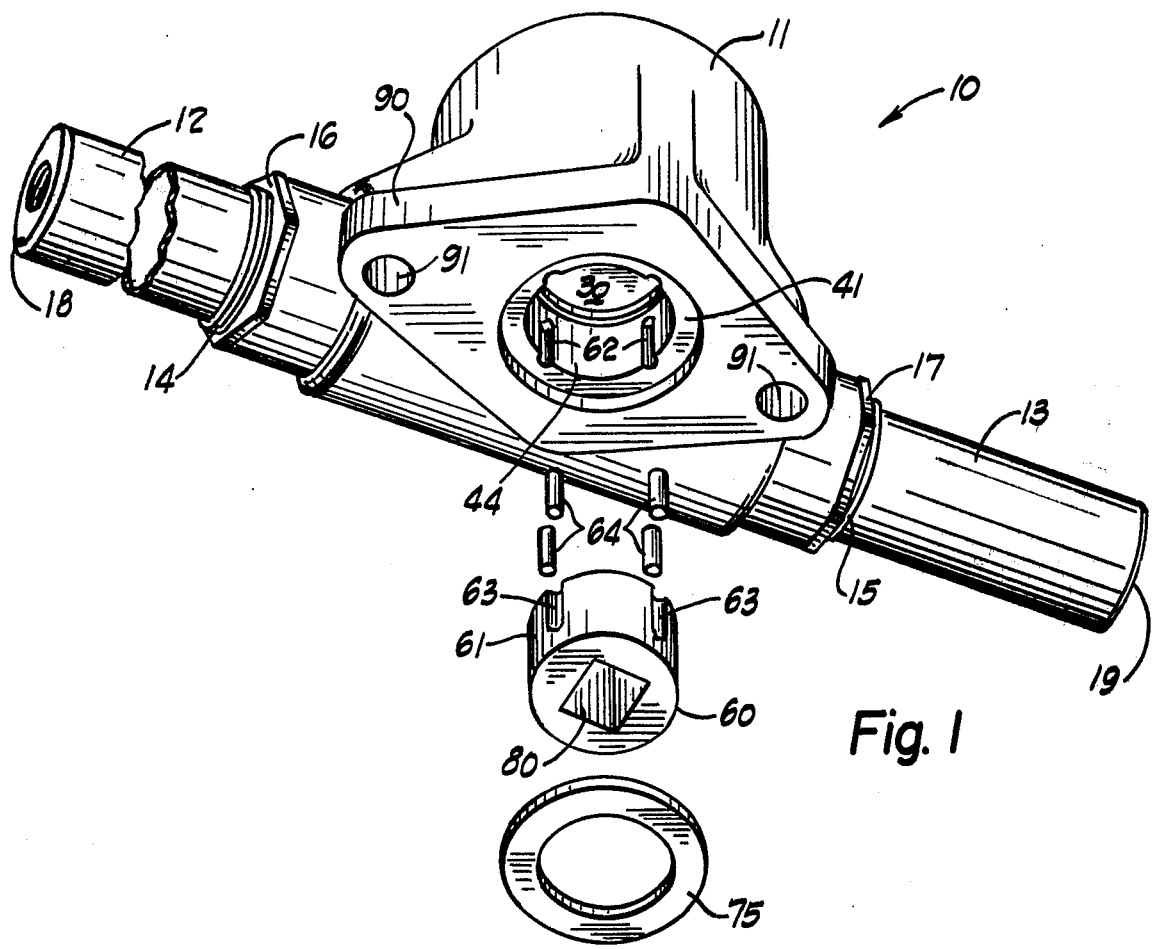
FIG. 1 is an exploded perspective view of an actuator constructed in accordance with the present invention.

Referring to FIG. 1, a fluid-operated actuator is shown generally at 10. The actuator 10 has a sealed housing which includes a body 11 and a pair of tubular sleeves 12, 13. The sleeves 12, 13 have inner end regions 14, 15 which are threaded into openings 12a, 13a formed in opposite sides of the body 11. Lock nuts 16, 17 releasably lock the sleeves 12, 13 against rotation relative to the body 11. A pair of plugs 18, 19 having threaded through apertures are welded in the outer ends of the sleeves 18, 19. Fluid conduits, not shown, may be threaded into the plugs 18, 19 to admit and discharge pressurized fluid into and from the sleeves 12, 13.

Referring to FIG. 4, the body 11 defines a central chamber 20. A piston 21 extends through the chamber 20 and has enlarged end regions 22, 23 slidably carried in the sleeves 12, 13. Circumferential grooves 24, 25 are formed in the piston end regions 22, 23. A pair of seals 26, 27 are carried in the grooves 24, 25 to prevent the passage of pressurized fluid along the piston end regions 22, 23 and into the chamber 20.

Referring to FIGS. 5 and 6, a stem assembly 30 is rotatably carried by the body 11. The stem has an upper end member 31 which extends through a bore 32 in the body 11. An O-ring 33 is carried in a circumferential groove in the end region 31 and seals the annular space between the end member 31 and the bore 32. A pair of flats 34 are formed on the end region 31 to permit manual rotation of the stem 30 with a wrench.

The stem 30 has a lower end member 41 of enlarged diameter positioned in a body opening 42. An O-ring seal 43 is carried in a circumferential groove in the lower end region 41 and seals the annular space between the end member 41 and the opening 42. A downwardly opening cylindrical recess 44 is defined by the end region 41.

The lower stem member 41 has a cylindrical outer wall 41a of relatively large diameter. The body 11 has a curved inner wall 11a which engages the stem wall 41a to form a large area thrust connection which journals the stem assembly 30 in the body 11.

A three-sided slot 52 is formed through the lower stem member 41. The upper stem member has a depending projection 51 which extends into the upper end region of the slot 52 to close the upper end of the slot 52 and to drivingly connect the stem member 31, 41.

A lever 53 has one end region which is slidably carried in the slot 52 and which slidably engages both of the stem members 31, 41. The other end region of the lever 53 pivotally connects with the piston 21. A slot 55 is formed through the piston 21. The lever 53 extends into the slot 55. A pin 56 extends through aligned aperture in the piston 21 and the lever 53 to pivotally connect the lever 53 and the piston 21.

The stem slot 52 has a length which is sufficient to accommodate the travel of the lever 53 as the lever 53 slides in the slot 52. This arrangement assures that the end of the lever 53 which slides in the slot 52 need never project beyond the peripheral wall 41a of the lower stem member 41 or contact the curved wall 11a of the body 11.

Figure 8:
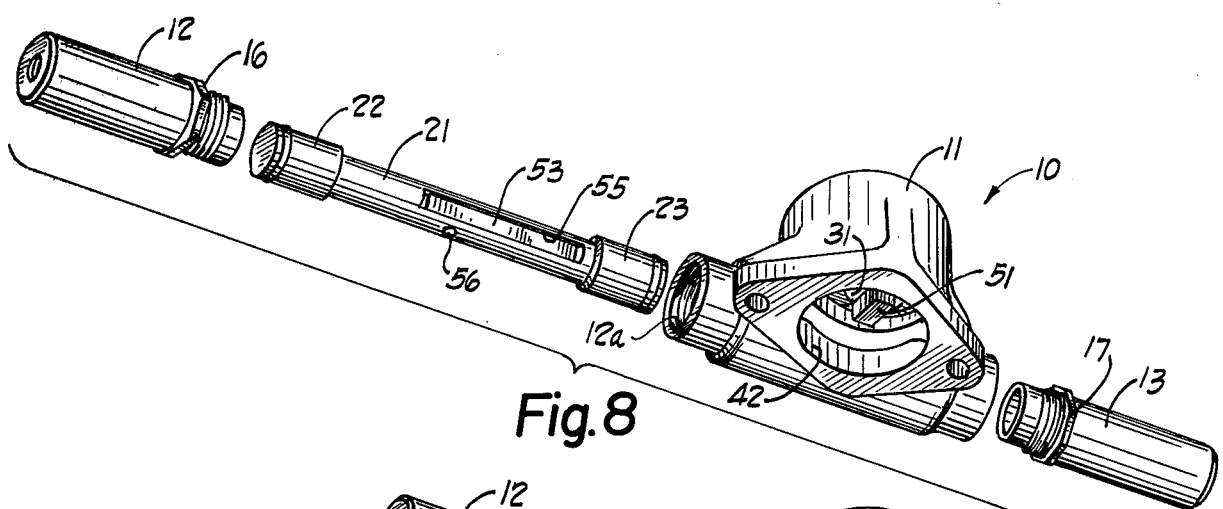

The piston slot 55 has a length which is sufficient to permit the lever 53 to be rotated to a nested position within the piston 21 to facilitate assembly of the actuator. As is shown in FIG. 8, the lever 53 can be nested within the slot 55 to permit insertion of the piston 21 and the lever 53 as an assembly through one of the openings 12a, 13a into the body 11.

Referring to FIG. 6, a grease fitting 57 is threaded into the body 11 at a location below the piston 21. Aligned passages 58, 59 formed respectively through the body 11 and the stem 30 communicate the grease fitting 57 with the slot 52 for lubricating the sliding connection between the lever 53 and the stem 30.

As the piston 21 reciprocates, the lever 53 is caused to slide in the stem slot 52. This sliding of the lever 53 in the slot 52 causes the lever-arm through which forces are transmitted from the piston 21 to the stem 30 to change as the piston moves through its stroke. The lever arm diminishes as the piston moves toward its central position shown in FIG. 4, and increases as the piston approaches opposite ends of its stroke. This variable lever arm provides a maximum torque for seating and unseating a valve when the piston is at opposite ends of its stroke.

The piston 21 is operable to rotate the stem 30 through about 90° of rotation as it travels through its stroke. The stroke of the piston 21 is defined by the plugs 18, 19 which serve as stops engaged by the piston 21. The piston stroke can be adjusted to a limited extend by loosening the lock nuts 16, 17 and threading the sleeves 12, 13, into or out of the body 11.

An adapter bushing 60 is removably carried by the lower end region 41 of the stem 30. As is best seen in FIG. 1, the bushing 60 has a cylindrical outer wall 61 which slip fits in the cylindrical recess 44. Semicircular grooves 62, 63 are formed respectively in the recess 44 and the outer wall 61. Dowel pins 64 are carried in the grooves 62, 63 and provide a driving connection between the bushing 60 and the stem 30.

Figures 2, 3:
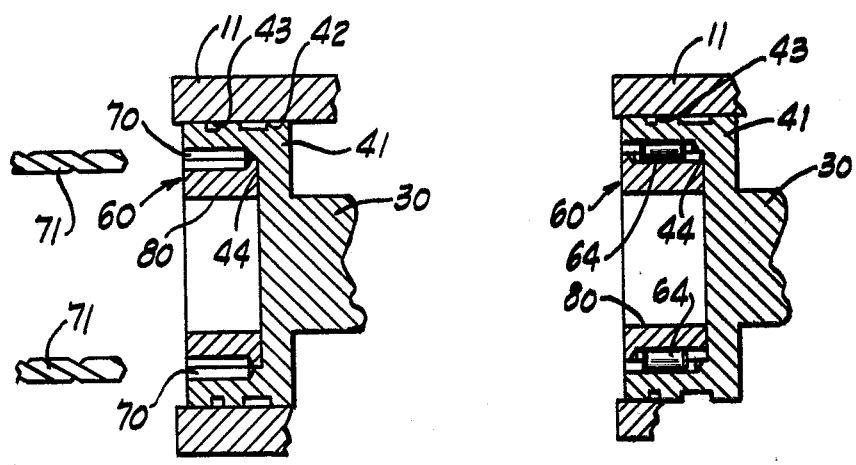
FIGS. 2 and 3 are enlarged cross-sectional views illustrating portions of the actuator during different stages of assembly.

The grooves 62, 63 are formed in a very simple manner illustrated in FIGS. 2 and 3. Referring to FIG. 2, the bushing 60 is initially inserted backwards into the recess 44. Holes 70 are then drilled by drill bits 71 along the circular juncture between the bushing 60 and the lower stem end region 41. The holes 70 extend only part way through the bushing 60.

Referring to FIG. 3, the dowel pin connection between the bushing 60 and the stem 30 is completed by removing the bushing 60 from the recess 44, turning it front-side-forward, inserting the dowel pins 64 in the grooves 63, and then inserting the bushing 60 together with dowel pins 64 in place in the recess 44 and the grooves 62.

A thrust washer 75 underlies the bushing 60. The washer 75 covers the juncture between the bushing 60 and the recess 44. The washer 75 depends below the housing 11 and facilitates aligning the actuator 10 with a valve or other device to be operated.

A central aperture 80 extends through the bushing 60. The aperture 80 is typically configured to receive and mate with a valve stem end region of relatively standard configuration. The bushing 60 is interchangeable with other bushings having central apertures of other sizes and shapes for use with other valve stem configurations. Moreover, the aperture 80 is readily through machined as by broaching or miling, etc., to conform it to any desired specialized configuration.

The actuator body 11 is provided with a mounting flange 90 for securing the actuator in place adjacent a valve or other device to be operated. A pair of mounting holes 91 are formed through the flange 90.

Figure 9:
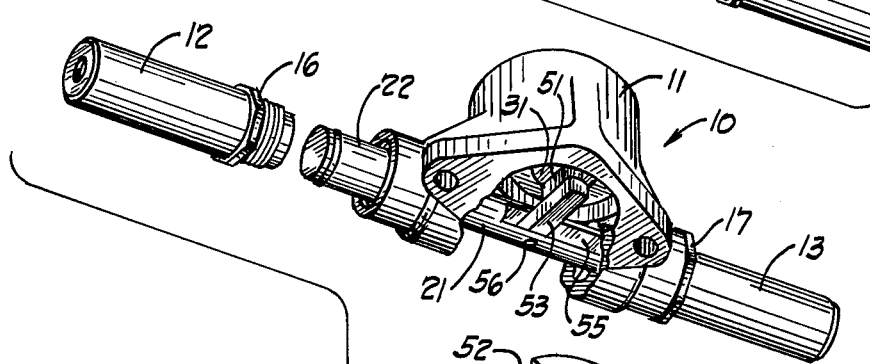

FIGS. 8 and 9 illustrate the steps of assembling the actuator 10. After the lever 53 is pivotally connected to the piston 21 to form a piston and lever assembly, the lever 53 is folded to a nested position within the piston slot 55. After the upper stem member 31 has been positioned in the body 11, the piston and lever assembly is inserted through the opening 12a into the body 11. As this assembly is inserted, the lever 53 is extended out of the slot 55 to extend through the chamber 20. The tubular sleeve 12 is then threaded into the opening 12a to support the piston end 22. The lower stem member 41 is then inserted through the opening 42 to a position where the three-sided slot 52 engages both the lever 53 and the lower projecting portion 51 of the upper stem member 31. The bushing 60, the dowel pins 64, and the thrust washer 75 are then positioned as has been described to enable the valve actuator 10 to be installed on a valve, indicated generally by the numeral 200. The valve 200 has a rotatable stem 201 which is configured to extend into and drivingly engage the bushing aperture 80.

Referring to FIG. 7, a heavier-duty actuator embodiment is shown at 10'. The actuator 10' principally differs from the described actuator 10 in that it has a multipart stem assembly 30' and a pair of levers 53', 53" instead of the dual part stem assembly 30 and the single lever 53. Other parts of the actuator 10' are equivalent to those described in conjunction with the actuator 10 and are designated with similar primed reference numerals.

The stem 30' includes upper and lower members 41', 41'. The ring 103' surrounds the juncture between sections 31', 41' to maintain their alignment. Dowel pins 104' extend into aligned apertures in the sections 31', 41' to provide a rigid driving connection between these sections.

A slot 52' is formed in the lower section 41' to receive the levers 53', 53". The upper section 31' has a projection 51' which depends into the upper end of the slot 52'. The levers 53', 53" are positioned one atop the other in the slot.

A still heavier-duty actuator can be formed by connecting the levers 53', 53" to separate pistons positioned on opposite sides of the stem 30'. This heavier-duty embodiment is not illustrated in the drawings inasmuch as it simply entails the modification of the housing 11' to accommodate an additional pair of sleeves supporting an additional piston in a symmetrical arrangement on the opposite side of the stem 30' from the described piston.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid actuator, comprising:
   (a) a housing structure defining a pair of spaced piston receiving portions and a communicating chamber;
   (b) the housing having an opening communicating with one of the receiving portions;
   (c) an output shaft structure journalled in the housing structure and having a slotted portion positioned in the chamber;
   (d) the slotted portion including walls which define a shaft slot;
   (e) a piston and lever assembly including:
      (i) a piston structure movably carried by the housing structure and having a pair of end portions each in an associated one of the receiving portions, the piston structure also including a central portion which interconnects the end portions and which defines a piston slot;
      (ii) a lever member having one portion in the piston slot and pivotally connected to the piston structure, and another portion slidably engaging the shaft slot walls to drivingly interconnect the piston structure and the output shaft structure; and
   (f) the lever member having an end extending into the piston slot, the piston slot being of sufficient size to permit the entire length of the lever member to be nested therein, the housing opening being of a size to permit the piston and lever assembly to be inserted therethrough for positioning in the housing structure.

2. The actuator of claim 1 wherein the shaft structure includes a hollow end region accessible from outside the housing structure, and a bushing is provided having peripheral portions that extend into the hollow end region and operatively engage the same and having a central portion adapted to receive and mate with an end region of a rotatable member for drivingly interconnecting the shaft structure and such rotatable member.

3. The fluid actuator of claim 2 wherein the output shaft structure inlcudes a hollow end region accessible through an open end of the housing from outside the housing, and such rotatable member end region and the bushing means are nested within the axial length of the hollow end region of the shaft structure.

4. The actuator of claim 2 wherein fastening means are present to removably drivingly connect the bushing and the shaft means, and said fastening means include a plurality of dowel pins positioned in aligned pairs of semicircular axially extending grooves formed in peripheral portions of said bushing and in said end region to position the bushing in removable engagement with the shaft means.

5. A fluid actuator comprising:
   (a) a housing assembly defining spaced fluid chambers and a communicating output shaft chamber, the shaft chamber being defined in part by an arcuately curved, inner, thrust absorbing, wall surface;
   (b) a double ended piston structure including a pair of piston portions each in an associated one of the fluid chambers, the piston structure also including a central portion between the piston portions;
   (c) an output shaft structure including a shaft chamber portion having an arcuately curved peripheral thrust surface coactable with the curved inner wall surface along at least a majority of the length of the curved inner wall surface to journal the shaft structure in the housing and absorb thrust loads;
   (d) the shaft structure also having walls which define a slot;
   (e) a lever member pivotally connected to the central piston portion and having a portion slidably engaging the slot walls; and
   (f) a piston slot formed in the central portion, the lever member extending into the piston slot and being pivotally connected to the piston structure, the piston slot being of sufficient size to permit the entire lever member to be nested therein, the housing assembly having an opening communicating with a fluid chamber and of a size to permit the piston structure and the lever member to be inserted as an assembly to pass therethrough for positioning in the housing assembly.

* * * * *

UNITED STATES PATENT OFFICE
CERTIFICATE OF CORRECTION

Patent No. 4,094,231　　　　　　　Dated　　June 13, 1978

Inventor(s) Paul Carr

It is certified that error appears in the above-identified patent and that said Letters Patent are hereby corrected as shown below:

Column 1, line 24, "compex" should be -- complex --

Column 2, line 53, "porvides" should be -- provides --

Column 8, line 4, "inlcudes" should be -- includes --

Signed and Sealed this

Twelfth Day of December 1978

[SEAL]

Attest:

RUTH C. MASON
Attesting Officer

DONALD W. BANNER
Commissioner of Patents and Trademarks